Patented Feb. 8, 1927.

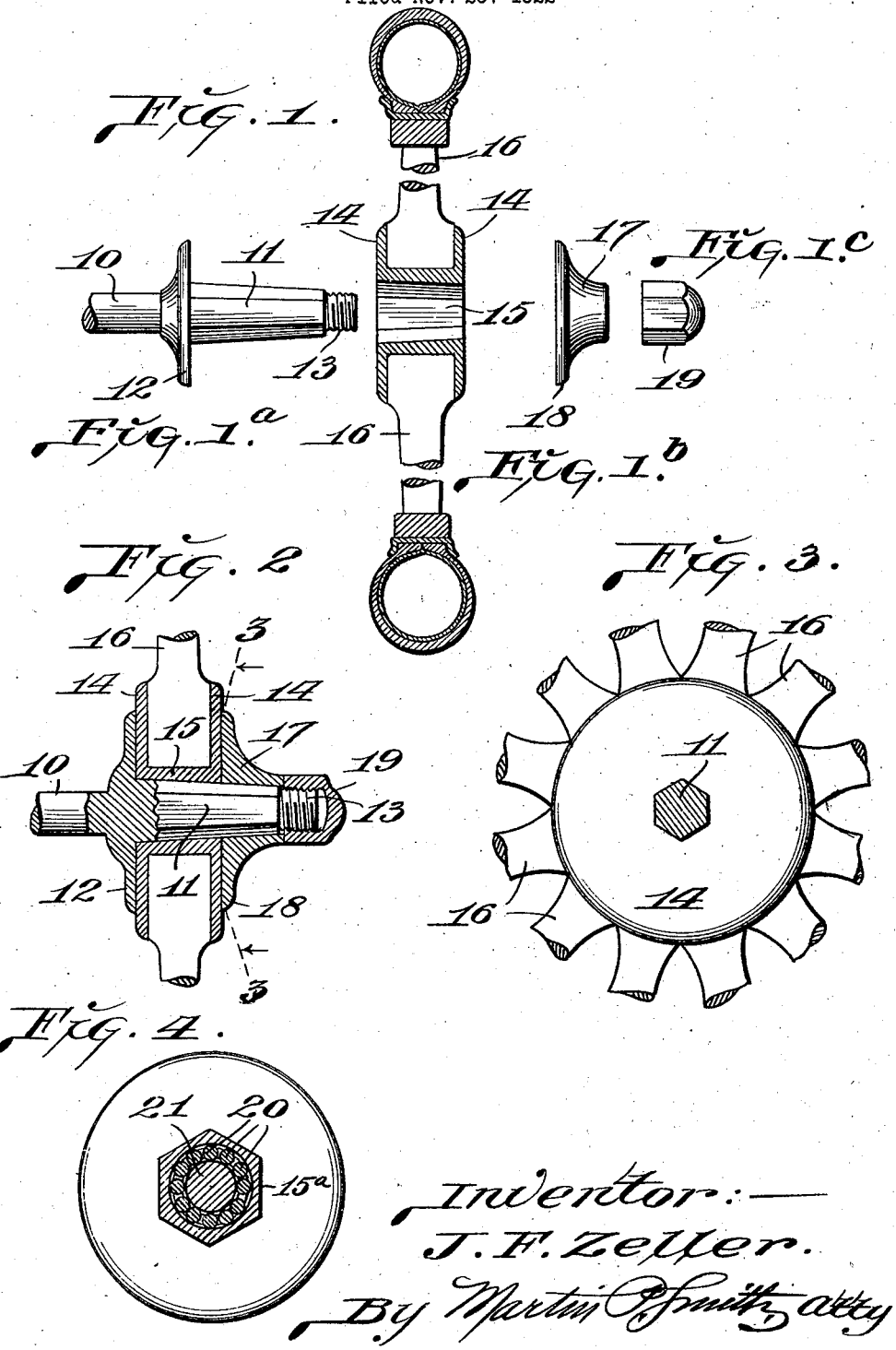

1,617,003

UNITED STATES PATENT OFFICE.

JACOB F. ZELLER, OF RIVERSIDE, CALIFORNIA.

DEMOUNTABLE WHEEL.

Application filed November 20, 1922. Serial No. 602,181.

My invention relates generally to improvements in readily demountable vehicle wheels, and more particularly to the wheel hub construction and its mounting on the spindle of the axle, the principal objects of my invention being to generally improve and simplify the construction of the existing forms of demountable wheels, further to provide a relatively simple, practical and efficient wheel hub mounting that will enable the wheel to be very easily and quickly removed from or replaced upon the axle spindle and further to provide a hub mounting of the character referred to that may be easily and cheaply manufactured.

With the foregoing and other objects in view, my invention consists in certain novel features of construction and arrangement of parts that will be hereinafter more fully described and claimed and illustrated in the accompanying drawings in which:

Fig. 1 is a verical section taken through the center of a motor vehicle wheel having a pneumatic tire and equipped with a spindle and spoke receiving socket of my improved construction;

Fig. 1ª is an elevationaal view of the spindle portion of my improved wheel hub structure;

Fig. 1ᵇ is an elevational view of the detachable collar forming a part of the invention;

Fig. 1ᶜ is an elevational view of the nut that is screw-seated on the end of the spindle.

Fig. 2 is a sectional view taken lengthwise through the center of the hub.

Fig. 3 is a cross section taken on the line 3—3 of Fig. 2.

Fig. 4 is a cross section of a modified form of the hub.

Referring by numerals to the accompanying drawings which illustrate a practical embodiment of my invention, 10 designates an axle having formed on its outer end, a spindle or hub carrying member 11, the latter being polygonal or non-circular in cross section and gradually tapering toward its outer end.

For all practical purposes, I prefer to form this member 11, hexagonal in cross section although any other convenient and desirable shape may be used.

Formed between the inner end of the spindle or member 11 and the body of the axle is a flange 12, and the outer end of said member 11 terminates in a short threaded stud 13.

The hub portion of the wheel contemplated by my invention included a pair of spaced plates or discs 14, the central portions of which are connected by a substantially tubular member 15.

This annular channel shaped hub member serves as a support and point of attachment for the inner ends of the spokes 16, or where disc wheels are made use of, the inner portions of the discs may be directly connected to the outer portions of the discs 14.

The opening through tubular member 15 is polygonal or non-circular to correspond with the shape of the member 11, and said opening also tapers slightly lengthwise, so that it may be snugly fitted onto said member 11.

A retaining collar 17, having on its inner edge, a flange 18, is provided with a polygonal or non-circular opening so as to be applied to the outer end of member 11 when the hub member is positioned thereupon and to retain the parts in assembled relation, a nut 19 is positioned on the threaded stud 13.

As this nut is tightened, the hub member is firmly clamped between the flange 12 and retaining member 17, and this clamping action, together with the co-operation between the engaging angular faces of members 11 and 15, is very effective in securing the wheel to the axle.

To remove the wheel from the spindle or member 11, it is only necessary to unscrew nut 19 and when this is done, retaining member 17 and the wheel may be easily and quickly withdrawn from said spindle.

The construction illustrated in Figs. 1, 2 and 3 and herein described is applicable to axles that rotate, for instance, the rear or driving axles of motor vehicles. Where the construction is applied to a non-rotating spindle, for instance, to the front wheel of a motor vehicle, the opening in the hub member 15ª is circular and its inner surface bears directly upon suitable anti-friction bearing members 20, that surround the nonrotating spindle 21, as clearly as shown in Fig. 4.

Thus it will be seen that I have provided relatively simple, practical and efficient means whereby vehicle wheels, for instance, wheels of the type generally used on motor vehicles, may be easily and quickly removed from or applied to the spindles of axles and such ready removal and replacement entirely eliminates time and labor involved in the changing of the generally used demountable rims and tires.

Obviously the details of construction in my improved demountable wheel may be varied in form and size without departing from the spirit of the invention, the scope of which is set forth in the appended claim.

I claim as my invention:—

The combination with a spindle that is polygonal in cross section and which tapers lengthwise, the inner end of said spindle having a shoulder and the outer end terminating in a threaded stud, of a wheel hub having a polygonal opening that is adapted to receive the inner portion of said spindle and bear against the shoulder at the inner end thereof, circular flanges projecting outwardly from the ends of the wheel hub, which flanges and the body of the hub constitute a three-sided housing for the inner ends of the spokes of the wheel, a retaining disc having a polygonal opening that is adapted to receive the outer portion of the spindle, the outer portion of which disc projects slightly beyond the outer end of the spindle when properly positioned thereupon and a nut screw-seated on the threaded stud for securing the hub and retaining disc on said spindle.

In testimony whereof I have signed my name to this specification.

JACOB F. ZELLER.